(12) United States Patent
Backmann et al.

(10) Patent No.: US 10,773,441 B2
(45) Date of Patent: Sep. 15, 2020

(54) OVERTURNING DEVICE FOR OVERTURNING MOLTEN MATERIAL AND PURGING METHOD

(71) Applicant: Windmöller & Hölscher KG, Lengerich (DE)

(72) Inventors: Martin Backmann, Lengerich (DE); Hermann-Josef Jäckering, Emsbüren (DE); Markus Bussmann, Essen (DE); Bernd Liesbrock, Lengerich (DE); Karsten Golubski, Haltern am See (DE)

(73) Assignee: Windmöller & Hölscher KG, Lengerich (DE)

( * ) Notice: Subject to any disclaimer, the term of this patent is extended or adjusted under 35 U.S.C. 154(b) by 566 days.

(21) Appl. No.: 15/508,216

(22) PCT Filed: Sep. 2, 2015

(86) PCT No.: PCT/EP2015/070073
§ 371 (c)(1),
(2) Date: Mar. 2, 2017

(87) PCT Pub. No.: WO2016/034638
PCT Pub. Date: Mar. 10, 2016

(65) Prior Publication Data
US 2017/0282434 A1   Oct. 5, 2017

(30) Foreign Application Priority Data

Sep. 3, 2014 (DE) .................. 10 2014 112 714

(51) Int. Cl.
*B29C 48/00* (2019.01)
*B29C 48/27* (2019.01)
(Continued)

(52) U.S. Cl.
CPC ........ *B29C 48/271* (2019.02); *B29C 48/0018* (2019.02); *B29C 48/10* (2019.02);
(Continued)

(58) Field of Classification Search
CPC ............................... B29C 48/326; F15D 1/02
See application file for complete search history.

(56) References Cited

U.S. PATENT DOCUMENTS 1,637,697 A * 8/1927 Jacobsen .............. B01F 5/0644
366/336
3,911,073 A 10/1975 Charles-Massance
(Continued)

FOREIGN PATENT DOCUMENTS

DE 6752197 2/1969
DE 1956459 5/1971
(Continued)

OTHER PUBLICATIONS

Machine translation of JP 2011-235546, retrieved from Google Patents Aug. 15, 2019 (Year: 2011).*
(Continued)

*Primary Examiner* — Timothy Kennedy

(57) ABSTRACT

The present invention relates to an overturning device (10) for overturning a molten material (200) in a melt channel (110) comprising a melt inlet (20) and a melt outlet (30), wherein between the melt inlet (20) and the melt outlet (30) at least a melt guidance means (40) is assembled for a rearrangement of molten material (200) from the centre (22) of the melt inlet (20) at the edge (34) of the melt outlet (30) and for a rearrangement of molten material (200) from the edge (24) of the melt inlet (20) in the centre (32) of the melt outlet (30).

10 Claims, 8 Drawing Sheets

(51) Int. Cl.
  *B29C 48/10* (2019.01)
  *B29C 48/36* (2019.01)
  *B29C 48/70* (2019.01)
  *B29C 48/255* (2019.01)
  *B29C 48/25* (2019.01)
  *B29C 48/275* (2019.01)
  *B29B 7/80* (2006.01)
  *B29C 48/30* (2019.01)
  *B29C 48/32* (2019.01)

(52) U.S. Cl.
  CPC ........ *B29C 48/256* (2019.02); *B29C 48/2552* (2019.02); *B29C 48/2692* (2019.02); *B29C 48/27* (2019.02); *B29C 48/277* (2019.02); *B29C 48/362* (2019.02); *B29C 48/705* (2019.02); *B29B 7/802* (2013.01); *B29C 48/30* (2019.02); *B29C 48/32* (2019.02); *Y02P 70/263* (2015.11)

(56) References Cited

U.S. PATENT DOCUMENTS

2005/0037220 A1* 2/2005 Smith .................. B29B 13/021
                                                              428/523
2011/0001267 A1    1/2011 Demin et al.

FOREIGN PATENT DOCUMENTS

| DE | 2006941 | 8/1971 | | |
|---|---|---|---|---|
| DE | 2129971 | 5/1972 | | |
| DE | 2428321 | 1/1976 | | |
| DE | 3245084 | 6/1984 | | |
| EP | 0113041 | 7/1984 | | |
| EP | 0887172 | 12/1998 | | |
| JP | 55-042869 | 3/1980 | | |
| JP | 58-69415 | 5/1983 | | |
| JP | 10-058521 | 3/1998 | | |
| JP | 2011-235546 | 11/2011 | | |
| WO | WO 2006/024181 | 3/2006 | | |
| WO | WO-2013173946 A1 * | 11/2013 | ............. | B29C 55/28 |

OTHER PUBLICATIONS

Internationaler Recherchenbericht und Schriftlicher Bescheid der Internationalen Recherchenbehörde [International Search Report and the Written Opinion] dated Nov. 17, 2015 From the International Searching Authority Re. Application No. PCT/EP2015/070073 and Its Translation of Written Opinion Into English. (15 Pages).

Internationaler Vorläufiger Bericht über die Patentierbarkeit [International Preliminary Report on Patentability] dated Nov. 18, 2016 From the International Preliminary Examining Authority Re. Application No. PCT/EP2015/070073 and Its Translation Into English. (30 Pages).

Prüfungsantrag [Examination Report] dated Mar. 27, 2015 From the Deutsches Patent—und Markenamt [German Patent and Trademark Office] Re. Application No. 102014112714.5 and Its Translation Into English. (10 Pages).

Schriftlicher Bescheid der mit der Internationalen Vorläufigen Prüfung Beauftragten Behörde [Written Opinion of the International Preliminary Examining Authority] dated Jul. 25, 2016 From the International Preliminary Examining Authority Re. Application No. PCT/EP2015/070073 and Its Translation Into English. (15 Pages).

* cited by examiner

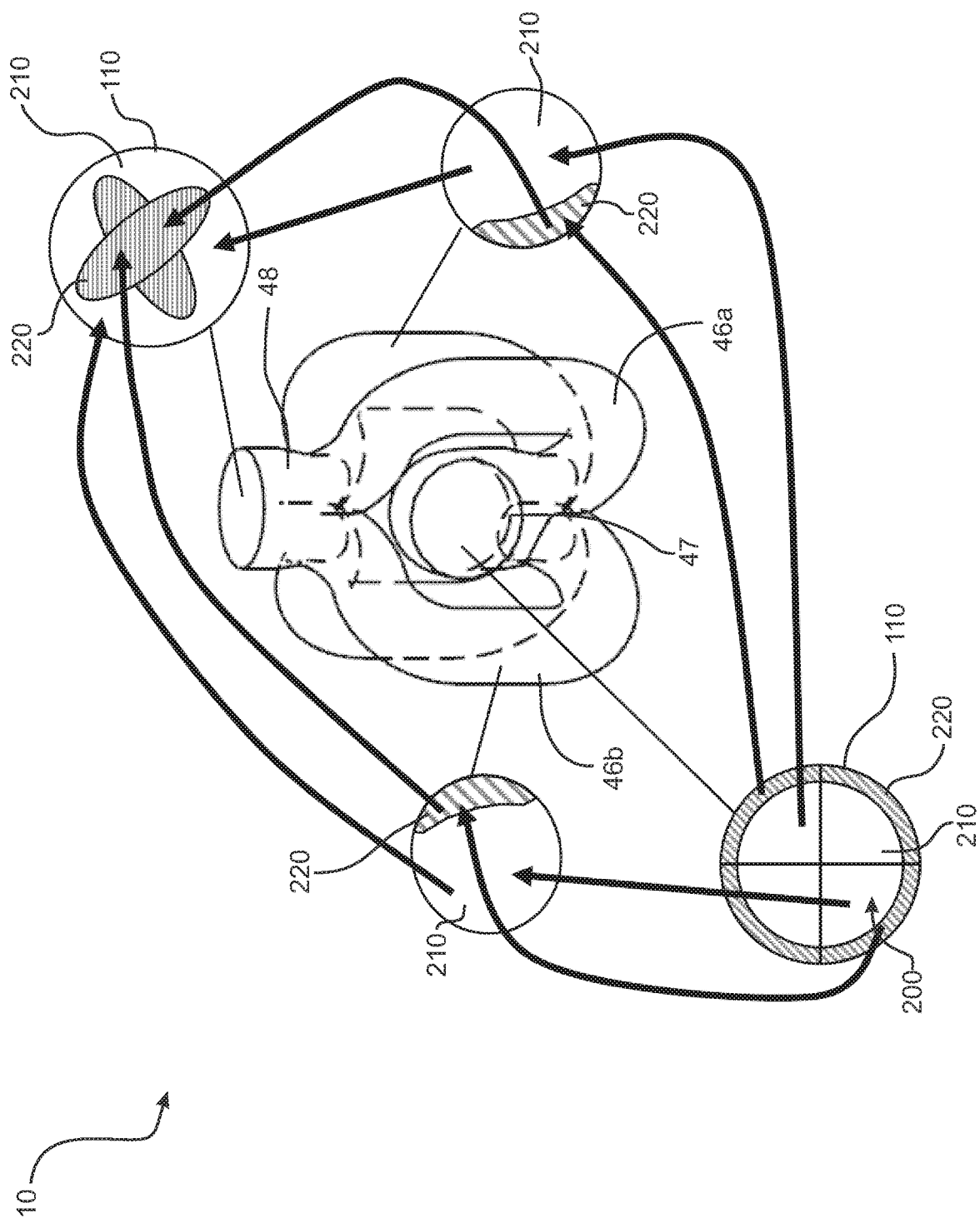

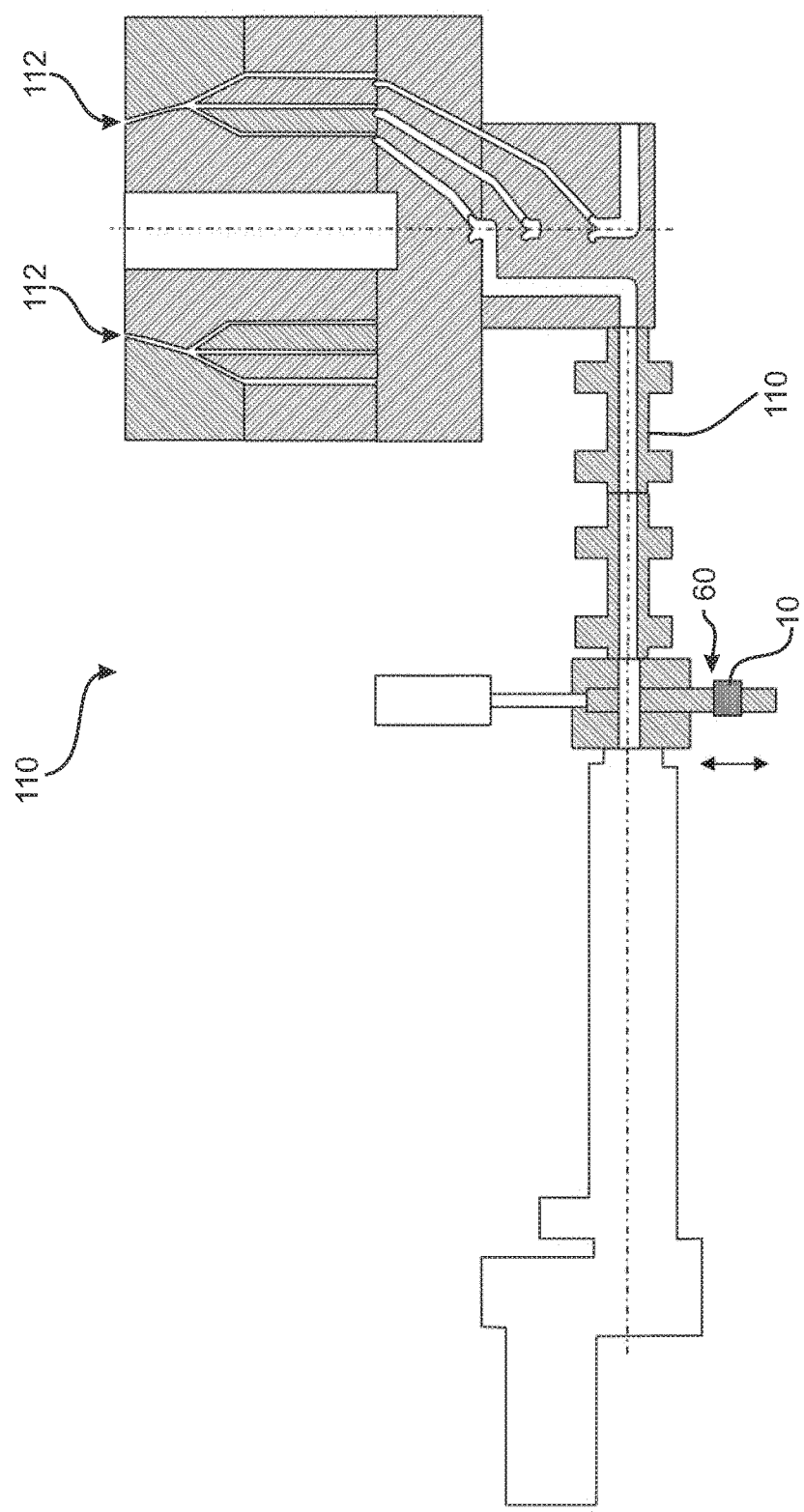

OVERTURNING DEVICE FOR OVERTURNING MOLTEN MATERIAL AND PURGING METHOD

RELATED APPLICATIONS

This application is a National Phase of PCT Patent Application No. PCT/EP2015/070073 having International filing date of Sep. 2, 2015, which claims the benefit of priority of German Patent Application No. 10 2014 112 714.5 filed on Sep. 3, 2014. The contents of the above applications are all incorporated by reference as if fully set forth herein in their entirety.

The present invention relates to an overturning device for overturning a molten material in a melt channel, a blow head for performing a blow film extrusion method and a method for performing a purge process in an extrusion device.

FIELD AND BACKGROUND OF THE INVENTION

It is known that extrusion devices are used in order to generate a plastic melt. This plastic melt can be continued to use in different manners. Thus, it is for example possible to introduce the molten material into a cavity of an injection moulding device in order to generate corresponding components by injection moulding. Likewise, it is known that the molten material is provided for a so called blow extrusion method with which a blow film is extruded. In all cases it is necessary that at the end of the extruder the liquefied molten material is transported to the respective place of use via corresponding melt channels. These channels can be arbitrarily complex and particularly divide up to single channels.

It is a disadvantage with known solutions of the extrusion device that they involve a high effort for the change of material. Thus, a so called purge process has to be performed in case the change of material from a first molten material to a second molten material should occur. In case with a blow extrusion device a certain time a product with a blue film colour is produced and subsequently a change to a transparent film colour is desired, thus initially the blue film colour and the corresponding molten material has to be purged out from the single melt channels. Herefore, the extrusion device is already operated with the subsequent material until the largest part of the old material of the molten material is purged out.

Since with melt channels in the edge area of these melt channels the transport velocity is mainly equal zero, the old material so to say sticks and the purge process is very time consuming. With blow extrusion devices with a through-put of up to approximately 120 kg molten material per hour thereby a purge process can normally take 20 minutes up to 1.5 hours. For each film layer for which a change of material should occur this leads to 120 kg or more waste material of the molten material. With multiple film layers the amount is multiplied with the amount of the film layers even if only one single film layer is purged. Therewith, the rejection rates of up to 1000 kg can be achieved. Simultaneously, the purge time comprises a dead time for the machine in which no useable production can occur. Accordingly, the known extrusion device with a corresponding purge process is afflicted with significantly recognizable disadvantages concerning the time effort and concerning the resulting costs and the waste material.

SUMMARY OF THE INVENTION

It is object of the present invention to at least partially avoid the previously described disadvantages. Particularly, it is object of the present invention to reduce the time for the purge process in a cost efficient and simple manner.

Previous object is solved by an overturning device with the features of claim 1, a blow head with the features of claim 4 and a method with the features of claim 13. Further features and details of the invention result from the dependent claims, the description and the drawings. Thereby, features and details which are described in relation to the overturning device according to the invention naturally also apply in connection with the blow head according to the invention and the method according to the invention and vice versa such that according to the disclosure of the single aspects of the invention it can always be reciprocally related to.

An overturning device according to the invention serves for overturning a molten material in a melt channel. Herefore, the overturning device comprises a melt inlet and a melt outlet, wherein between the melt inlet and the melt outlet at least one melt guidance means is assembled. The melt guidance means serves for a rearrangement of the molten material from the centre of the melt inlet to the edge of the melt outlet. Further, the melt guidance means is configured for a rearrangement of molten material from the edge of the melt inlet into the centre of the melt outlet.

By the centre of the melt channel thereby basically each area is to be understood which is spaced apart from the edge. Particularly, a rearrangement occurs away from the edge. For example, the centre of the melt channel can be the whole melt outlet area with a distance to the edge of approximately 5 mm.

By an overturning device according to the invention, thus, a rearrangement of the molten material in the melt channel occurs automatically without moveable parts by an active guidance with the help of the melt guidance means. The overturning device can be inserted into the melt channel or can configure a part of a melt channel. Via the melt inlet a fluid communicating connection to the melt channel is established such that the molten material can flow into the overturning device via the melt inlet. Subsequent to passing the melt inlet the molten material is rearranged via the melt guidance means in a manner according to the invention. At the melt outlet the rearranged molten material can exit the overturning device and further flow via the fluid communicating connection in the melt channel.

According to the invention the melt guidance means are configured for rearranging the molten material. Thereby, two basic layer functionalities are provided. At the melt inlet the molten material from the centre is used and is guided to the edge of the melt outlet. Simultaneously and via the same length a rearrangement of the molten material from the edge of the melt inlet into the centre of the melt outlet occurs. Therewith, the material from the centre of the melt inlet is exchanged with the material from the edge of the melt outlet such that at the melt outlet a completely rearranged melt layer situation is existent.

An overturning device according to the invention significantly reduces the purge time with the use in an extrusion device. Thus, in a purge situation in the extrusion device it can be assumed that old molten material remains longer in the area of the edge of the melt channel than in the centre. Thus, during the purge process the centre of the melt channel is relatively fast filled with fresh and therewith new molten material, while at the edge still a high amount of old materials remains. By the use of an overturning device according to the invention now a rearrangement of this old material from the edge of the melt channel into the centre of the melt channel occurs and therewith in the area of the fast and increased flow through quote. This leads to the fact that so to say old molten material in front of the overturning device is rearranged into the centre of the melt channel after the overturning device such that now in the centre it can be faster transported away. Thereby, that this rearrangement occurs in a manner according to the invention a significant reduction of the purge time can be achieved by a faster output of the old material from the melt channel.

Particularly, by an overturning device according to the invention a reduction of up to 50% of the whole purge time can be achieved. A further advantage is the reduction of the retention time of the molten material at the edge even in the normal operation. In this manner the thermal impact to the material can be reduced wherein material interferences are reduced or even avoided.

The overturning device can thereby be introduced into the melt channel or can configure the melt channel. Naturally, in a melt channel two or more overturning devices can be provided with a defined distance. It is preferred like subsequently described when the overturning device related to the length of the melt channel is assembled mainly in the centre.

The melt guidance with the help of the melt guidance means can thereby be configured in different manners. Thus, the subsequently described functionalities in a division can be provided by a melt guidance means exactly like this is possible by active guidance channels within the melt channel. These two different overturning functionalities are subsequently described in detail.

Thus, it can be an advantage when with the overturning device according to the invention the at least one melt guidance means comprises a first guidance channel with a guidance opening in the centre of the melt inlet and at least one guidance outlet at the edge of the melt outlet. Herefore, an active overturning within a single melt channel occurs such that an installation of a separate overturning device in an existing geometry of the melt channel is possible. By receiving into the guidance opening now the new or fresh material of the molten material is guided to the edge and put out via the guidance outlet at the melt outlet. There it replaces the existing old molten material into the centre such that by a passive shifting a complete rearrangement is achievable. Naturally, however a movement of the old molten material from the edge into the centre can occur actively like this is subsequently described by a second guidance channel. By a guidance channel an entirely closed channel can be understood. However, partly lateral open guidance channels in form of so called slides or ramps can be understood as guidance channels within the sense of the present invention. Accordingly, the guidance opening and the guidance outlet can comprise an entirely outlined geometry or can be equipped with a lateral opening, respectively.

It can be a further advantage when with the overturning device according to the previous paragraph the at least one melt guidance means comprises a second guidance channel with a guidance outlet in the centre of the melt outlet and at least one guidance opening at the edge of the melt inlet. Therewith, the second guidance channel serves so to say for the inverse functionality like the first guidance channel. Via the guidance opening the molten material and therewith old molten material of the molten material can be received from the edge of the melt inlet and guided actively with the second guidance channel into the centre via the guidance outlet at the melt outlet. Therewith, not only by replacing but by active guiding and rearrangement the corresponding rearrangement according to the invention from the edge to the centre and from the centre to the edge is enabled. The combination of two guidance channels is thereby intended preferably parallel such that the guidance opening of the first guidance channel and the guidance opening of the second guidance channel are assembled in flow direction at the same or mainly the same position of the overturning device. Simultaneously, it is an advantage when also the guidance outlet of the first guidance channel and the guidance outlet of the second guidance channel in relation to the flow direction are arranged at the same or mainly the same position at the melt outlet. Likewise it is an advantage when all guidance channels of the at least one melt guidance means comprise the same or mainly the same free flow area in order to ensure a clean rearrangement, particularly with defined volume flows. Thereby, the single flow cross sections are preferably configured to provide equal or mainly equal flow velocities. Therewith, an undesired rupture of the single layers is avoided with a high probability and therewith a high security.

It is further an advantage when with the overturning device according to the invention the at least one melt guidance means comprises a separation section with a first separation channel and a second separation channel. Therewith, in front of the separation channel a division section for dividing the molten material to separation channels and after the separation section a combination section for merging the molten material from the separation channels is assembled. This configuration of the melt guidance means is naturally basically combinable with the melt guidance means of both previous paragraphs. By this separation functionality likewise a rearrangement can occur. Thus, via a separation section the amount of the molten material is separated in both separation sections. This naturally applies for the edge layer of the molten material such that in both separation channels only part of the edge, namely particularly the half of the edge, is equipped with the old molten material, while in the area of the separation section the other half of the edge is already equipped with fresh molten material. In case the combination section for merging the molten material from the separation channels is adjusted geometrically this leads to the fact that at least a part of the edge layer remains with new molten material even with combining the partial flows of the molten material. Therewith, via the functionality of separation and combining likewise the possibility of a rearrangement according to the invention can be ensured. Particularly, such a partly performed rearrangement with a corresponding separation section is combined with guidance channels like it is described in the previous paragraphs.

An overturning device according to the previous paragraph can be further improved in that the combination section is configured for a central merging of the edge sections of the molten material. Thereby, it is to be understood that an explicit geometric adjustment of the single separation channels in the combination section occurs. In case after the division section the edge sections with old molten material are located at the outer side of the respective separation channel, thus both separation channels can be merged in a combination section in a way that now both edge sections of the molten material are merged in the separation channels centrally with old molten material. Therewith, a recombination of the partial flows of the molten material occurs by a complete or mainly complete rearrangement such that now by a clever recombination of the partial flows the edge layer in front of the melt inlet is rearranged into the centre of the melt outlet. Simultaneously, new molten material from the centre of the melt outlet is rearranged into the edge layers and therewith at the edge of the melt outlet. Therewith, preferably the respective diameters of the separation channels are adapted to the diameter in front of the division section and after the combination section.

A further advantage is achievable when with an overturning device according to the invention a shifting device is provided for shifting an overturning device between a first position and a second position. In the first position the melt inlet and the melt outlet are in a fluid communicating connection with the melt channel. In a second position the melt inlet and the melt outlet are separated from the melt channel. Therewith, the shifting device can for example perform a movement of the overturning device translatory, rotatory or in a combined manner. Particularly, thereby for the overturning device in the second position a pipe section or a channel section is provided which connects both remaining edge sections of the melt channel with one another in a fluid communicating manner. The shifting device allows switching on the rearrangement function by pushing in the overturning device and switching off by pushing out the overturning device. Since the overturning device generates a pressure loss situation by the overturning functionality it is an advantage to switch off the overturning device in the normal operation. Therewith, the increased pressure loss only during the purge process emerges in order to ensure the corresponding rearrangement function. The increased pressure loss of the overturning device is switched off in the second position in the normal operation by pushing out of the overturning device and accordingly cannot further disturb.

It is further an advantage when with the overturning device according to the invention the melt inlet and the melt outlet comprise a free flow area which corresponds or mainly corresponds to a free flow area of the melt channel. In other words a fluid communicating connection between the melt inlet and the melt channel or between the melt outlet and the melt channel is enabled in a continuous manner without edges or variations in cross section. Such an overturning device can be completely inserted into the melt channel or can even partially configure the melt channel. By a free flow area thereby the cross section perpendicular to the flow of the respective position has to be understood. In other words the free flow area configures the flow cross section area via which the volume flow of the molten material can flow.

It is further an advantage when with the overturning device according to the invention the free flow area of the melt guidance means corresponds or mainly corresponds to the free flow area of the melt inlet and/or the free flow area of the melt outlet. Particularly, this embodiment is combined with an embodiment according to the previous paragraph. The flow cross section of the flow guidance means is thereby preferably the amount of all flow guidance means. By this equivalence a constant free flow cross section is provided such that the pressure loss by narrowing the cross section is avoided or mainly avoided. This reduces the adjusted pressure loss during flow through of the molten material. It remains only or mainly only a pressure loss which is generated by the corresponding influence to the flow direction and therewith corresponding to the active rearrangement. Thus, for example an extension of the melt channel can permit such a geometrical correlation in the area of the overturning device. Further, it is possible that with division in a separation section a corresponding adjustment of the flow cross section via corresponding cross sections of the separation channels can be provided.

Likewise, subject matter of the present invention is a blow head for performing a blow film extrusion method. Such a blow head comprises at least a melt channel for the conveyance of molten material to a blow outlet of the blow head. A blow head according to the invention is characterized in that in the at least one melt channel at least an overturning device according to the present invention is assembled. Therewith, a blow head according to the invention comprises the same advantages like they are described in detail for the overturning device according to the invention. The melt channel is thereby in a fluid communicating connection with the melt inlet and the melt outlet of the overturning device. Particularly, such a blow head is provided with two or multiple melt channels for different layers of the blow film. The overturning device is preferably assembled in the same or identical configuration in all melt channels in order to be able to provide the same purge time reduction for all melt channels in a manner according to the invention.

A blow head according to the previous paragraph can be further improved in that the overturning device related to the length of the melt channel is assembled in the centre or mainly in the centre of the melt channel. Thereby, this is about an optimized positioning of the overturning device which ensures the maximum reduction of the purge time of about approximately 50%. Naturally, also two or multiple overturning devices are possible which are used preferably with the same or identical separation in the respective melting channel.

It can further be an advantage when with a blow head according to the invention the overturning device in a melt channel is assembled in form of a supply channel from the extruder to the melt channels in form of distributor channels in the blow head. A blow head according to the invention is preferably assembled by a plurality of single components. An extrusion device configured separated from the blow head can comprise a corresponding extrusion screw in which this extruder material can melt to the molten material. In order to bypass the distance between the extruder and the blow head the blow head can comprise a supply channel or multiple supply channels. Thus it is possible that the overturning device is assembled in the supply channel such that already at this position the functionality according to the invention is given. Simultaneously it is possible that within the distribution channels corresponding overturning devices are assembled. Likewise, a combination of the assembly of the overturning device at different positions is possible within the scope of the present invention. A great advantage of the assembly of the overturning device in the melt channel in form of a supply channel is the good accessibility. Therewith, already the arrangement or mounting of the overturning device can occur easily, cost-effectively and fast. Likewise it is possible that the existing blow heads are retrofitted with an overturning device according to the invention. Further, the maintenance and the exchange of the overturning device is significantly simplified with the corresponding arrangement with the melt channel in form of a supply channel.

It can likewise be an advantage when with the blow head according to the invention the blow head comprises single components, wherein the melt channels and the at least one overturning device is assembled between the single components. Blow heads can comprise highly complex distribution systems for the melt channels. In order to be able to generate these high complex geometries of the melt channels often single components are provided from which the blow head is assembled. For example, in single disks or layers or single separate components the corresponding melt channels can be milled as components. By the arrangement in correlation with the neighbouring component the respective melt channel is closed and therewith provided fluid tight. The configuration of the blow head by single components allows that also the overturning device is configured in a corresponding manner. Thereby, the overturning device can be configured as part of the melt channel and therewith as part of the component of the blow head, particularly in an integral manner. Naturally, it is possible that the single components comprise a corresponding acceptance recess in order to insert one or multiple overturning devices. Therewith, the mounting of the blow head in an existing manner is possible and simultaneously a functionality according to the invention is achievable by the arrangement of the overturning device.

It is further an advantage when with the blow head according to the invention the melt channels branch out within the blow head and the at least one overturning device is arranged in at least one branching stage. Starting from a supply channel normally by reduction of the cross section a corresponding division and therewith a branching of the melt channels is achieved. Particularly, when by the blow head a circular blow outlet is supplied with the corresponding molten material, such a branching, particularly in the direction of the perimeter, is necessary. The single branching stages are characterized by an increase of the amount of the melt channels. Simultaneously, the cross section is reduced. The single branches define the borders between the single branch stages. It is preferred when on at least one branch stage an overturning device ensures the rearrangement function in a manner according to the invention. Naturally, also on different branching stages corresponding overturning devices can be provided. By the branching thereby already a division of the molten material and therewith a partial division of the corresponding edge layer occurs. Therewith, in the branch stages the respective overturning device can comprise a reduced perimeter impact such that the rearrangement is only performed for the remaining edge area.

It is further an advantage when with the blow head according to the invention the at least one overturning device is configured as part, particularly integral part, of the melt channel. This means that the melt channel is inserted directly into the overturning device and continues on the other side. The overturning device is preferably configured from one piece or integral with the melt channel. Particularly, this leads to a continuous transition between the overturning device at the melt inlet or at the melt outlet and the melt channel. Therewith, a production directly in the blow head can be achieved in a cost efficient and simple manner. Therewith, the risk of a malposition of the overturning device in the melt channel is reduced and therewith the undesired high pressure loss is significantly reduced.

It can be further an advantage when with the blow head according to the invention at least two overturning devices are assembled in the melt channel particularly with the same distances. Particularly, thereby the distance between the neighbouring overturning devices is chosen particularly large or sufficiently large in order to perform no undesired rearrangement and therewith back arrangement of the first overturning device. It is further an advantage when the distances between the beginning of the melt channel and the first overturning device between the two overturning devices and between the second overturning device and the end of the melt channel are configured equally or mainly equally. The amount of the overturning devices is thereby preferably limited and preferably exceeds according to the length of the melt channel not the amount of four. This leads to a minimum distance between the single overturning devices which avoids a cancellation of the rearrangement according to the invention. Simultaneously, in this manner a further reduction of the purge time in the blow head can be achieved.

It can be a further advantage when with the blow head according to the invention in all melt channels a least one overturning device is assembled at the same position respectively. Thereby, it has to be understood that in relation to the length of the respective melt channels or in relation to the arrangement in the respective branch stage all melt channels possess the same or mainly the same position for the overturning device. This means that the overturning device and therewith the reduction of the purge time is equal for all melt channels for different layers of the to be produced blow film. In other words, a bottleneck is consciously avoided such that the purge time reduction by the rearrangement functionality is provided equally for all solutions.

It is further an advantage when with the blow head according to the invention the overturning device comprises a shifting device like it is already described in detail in relation to an overturning device according to the invention.

With a blow head according to the invention it is possible that with a combination of two or multiple overturning devices one after the other, each overturning device only covers part of the respective edge and therewith only from this part of the edge the molten material is rearranged into the centre. Thereby, preferably each overturning device can perform the rearrangement for another perimeter section such that after the passing of all overturning devices the molten material is rearranged from the entire edge into the centre. For example four overturning devices one after the other can cover 90° of the extent of the edge with a rearrangement function respectively such that in total the whole extent of 360° is rearranged.

A further embodiment of the present invention is a method for performing a purge process in an extrusion device, particularly in a blow head according to the present invention comprising the following steps:

Introducing a molten material into a melt inlet of the overturning device, particularly according to the present invention, Rearrangement of molten material from the centre of the melt inlet to the edge of a melt outlet of the overturning device, and Rearrangement of molten material from the edge of the melt inlet into the centre of the melt outlet.

Naturally, a blow head according to the invention and/or the corresponding overturning device can be used with other extrusion units, for example, in a film extrusion, particularly in a flat film extrusion. Therewith, the blow head can be basically configured as an extrusion head.

A method according to the invention comprises the same functionalities according to the invention like an overturning device according to the invention such that the same advantages are achieved like they are described in detail in relation to the overturning device according to the invention.

BRIEF DESCRIPTION OF THE SEVERAL VIEWS OF THE DRAWINGS

Further advantages, features and details of the invention result from the subsequent description in which in relation to the drawings embodiments of the invention are described in detail. Thereby, the described features in the claims and in the description can be essential for the invention each single by themselves or in any combination. It is shown schematically:

DESCRIPTION OF SPECIFIC EMBODIMENTS OF THE INVENTION

Figure 1:
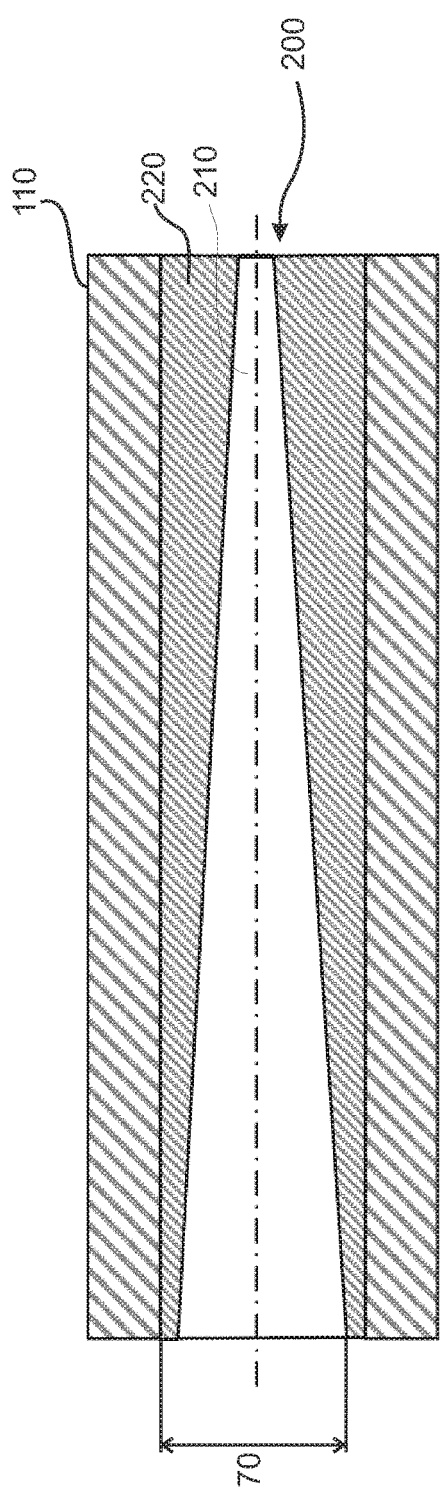
FIG. 1 a schematic representation during a purge process with known extrusion devices, FIG. 2 the situation according to FIG. 1 with the use of an overturning device according to the invention, FIG. 3 an embodiment of an overturning device according to the invention, FIG. 4 the embodiment of FIG. 3 with further representations of flow conditions of the molten material, FIG. 5 a schematic representation of the effect of an overturning device according to the invention, FIG. 6 a further embodiment of an overturning device according to the invention, FIG. 7 a further embodiment of an overturning device according to the invention, FIG. 8 an embodiment of a blow head according to the invention, FIG. 9 a further embodiment of a blow head according to the invention, FIG. 10 a further embodiment of a blow head according to the invention, FIG. 11 a further embodiment of a blow head according to the invention, and FIG. 12 a further embodiment of a blow head according to the invention.

In FIG. 1 a melt channel 110 with a flow direction from the left to the right is shown, as it is represented during the purge process. Within the melt channel 110 a free flow area 70 is provided through which molten material 200 flows. Here, it is to be differentiated between the old molten material 220 and new molten material 210. It can be recognized that via the longitudinal course of the melt channel 110 during the purge process a ramp-like or cone-like configuration between the old molten material 220 and the new molten material 210 is configured. This cone moves during the purge time in the course to the right until finally the greatest part of the old molten material 220 is put out and it can be further proceeded with the active production.

Figure 2:
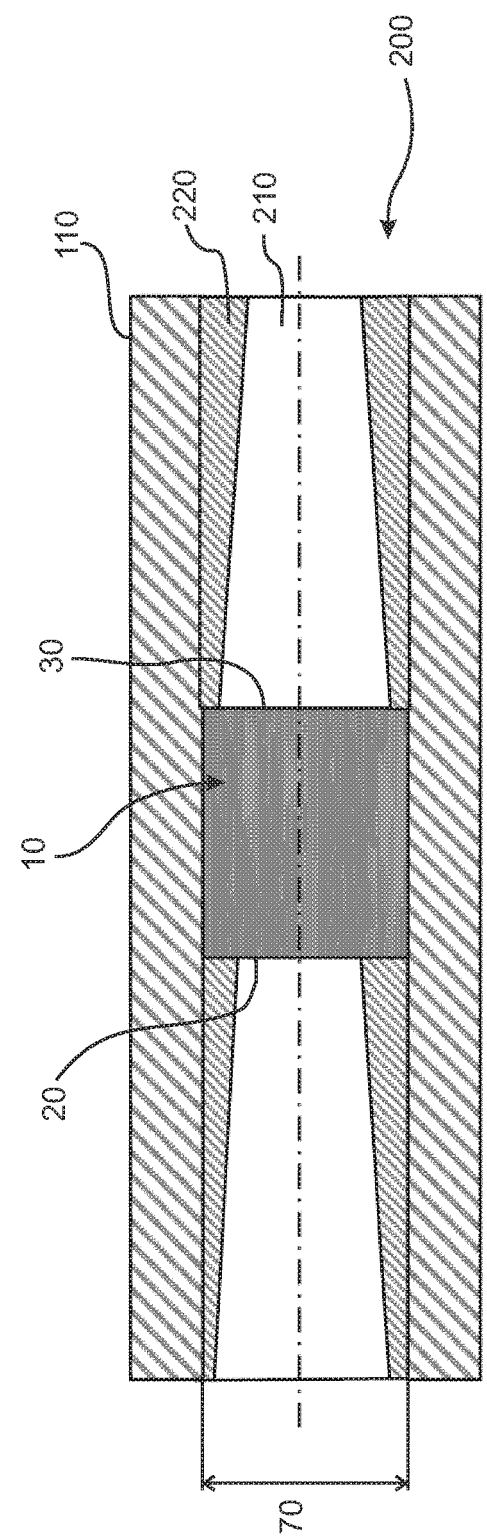

In FIG. 2 the mode of action of an overturning device 10 according to the invention is shown. Here, now a rearrangement from the edge of the molten material 200 into the centre of the molten material 200 and vice versa occurs. At the melt inlet 20 of the overturning device 10 corresponding material is received from the edge of the molten material 200 and is provided in the centre at the melt outlet 30. In an inverse manner fresh or new molten material 210 is guided from the centre of the melt inlet 20 to the edge of the melt outlet 30. Like it can be recognized, therewith the adjusted amount of the old molten material 220 at the right edge of the melt channel 110 is reduced. The representation of FIG. 2 occurs at the same time point during the purge process like FIG. 1.

Figure 3:
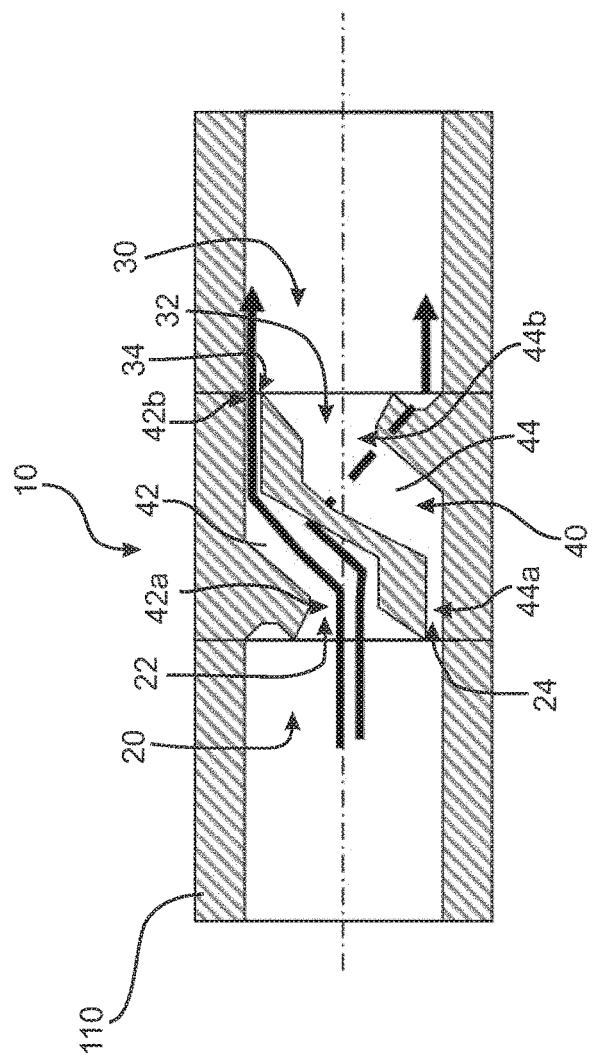
Figure 4:
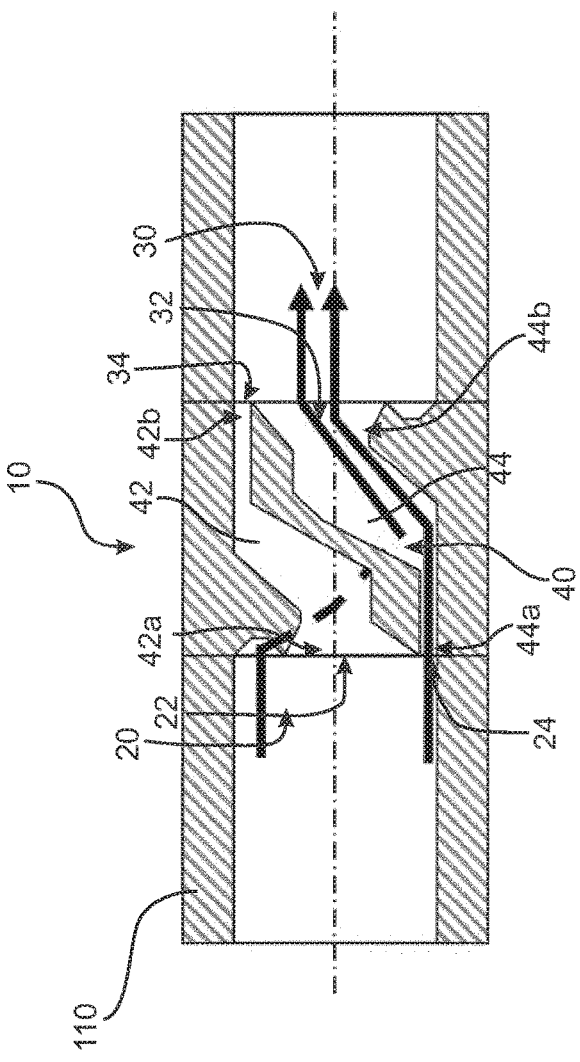

FIGS. 3 and 4 show a first embodiment of an overturning device 10 according to the invention. This overturning device 10 is configured with two guidance channels 42 and 44 as melt guidance means 40. Via a not further explained ring collector a guidance opening 44a is provided at the edge 24 of the melt inlet 20 such that corresponding molten material 200 can flow into the second guidance channel 44. This is shown with arrows in FIG. 4. Via a guidance outlet 44b in the centre 32 of the melt outlet 30 now the rearrangement occurs from the edge into the centre of this molten material 200.

In the same manner in the centre 22 of the melt inlet 20 a guidance opening 42a of the first guidance channel 42 is provided which enables along the arrows of FIG. 3 to rearrange the molten material 200 to the edge 34 of the melt outlet 30 and the corresponding guidance outlet 42b. Hereby, this is about a technical solution via an active rearrangement, wherein the overturning device 10 is part of the melt channel 110.

Figure 6:
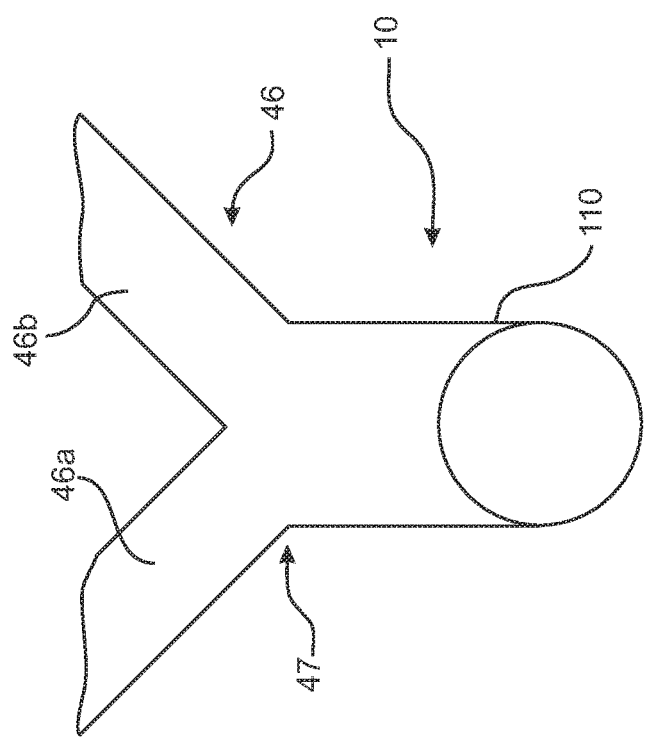
Figure 5:
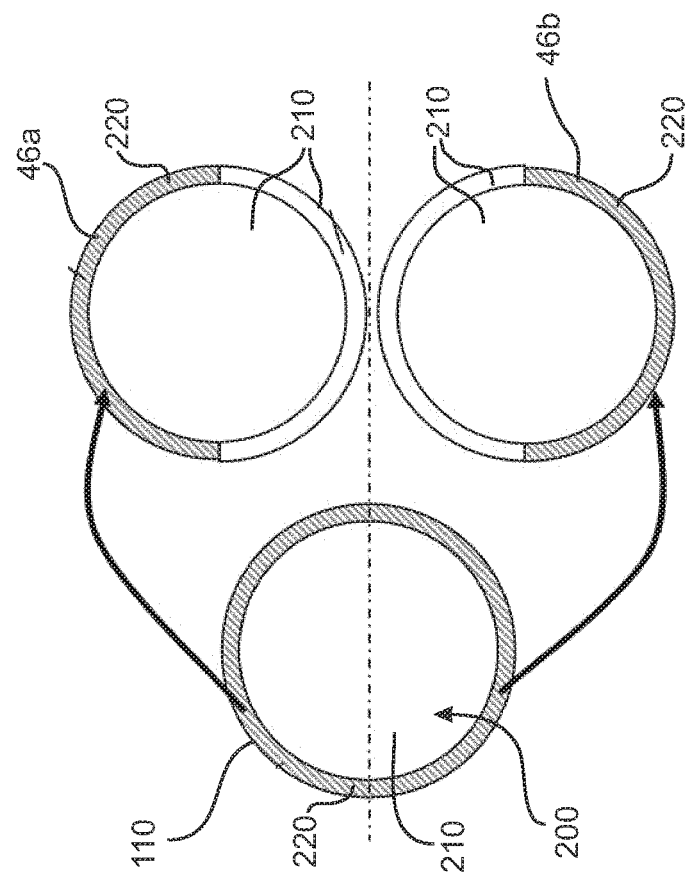

FIGS. 5 and 6 show the possibility to provide a rearrangement by a separation functionality. Starting from a melt channel 110 according to FIG. 6 via a division section 47 a division of the molten material 200 to two separation channels 46a and 46b of the separation section 46 occurs. This leads schematically to a distribution according to FIG. 4. While starting from the melt channel 110 completely extensive old molten material 220 encloses the new molten material 210, by the division in the separation channel 46a and 46b only approximately half of the extent is covered with old molten material 220. The other half in the separation channel 46a and 46b is already provided with new molten material 210 at the edge. Now, by clever combining a central merging of both separation channels 46 for the edge areas with the old molten material 220 is performed so that a complete or at least partial rearrangement according to the invention can occur by this separation function.

FIG. 7 shows schematically a possible further embodiment of an overturning device 10 with the separation functionality. Here a division of in total four separation channel 46a and 46b and the recombination in a combination section 48 occurs. Schematically, further the corresponding division of old molten material 220 and new molten material 210 in the corresponding channels is shown. After combining or merging at the combination section 48 the edge sections with the old molten material 220 are completely central such that the surrounding edge in the melt channel 110 is mainly completely configured by the new molten material 210.

Figure 8:
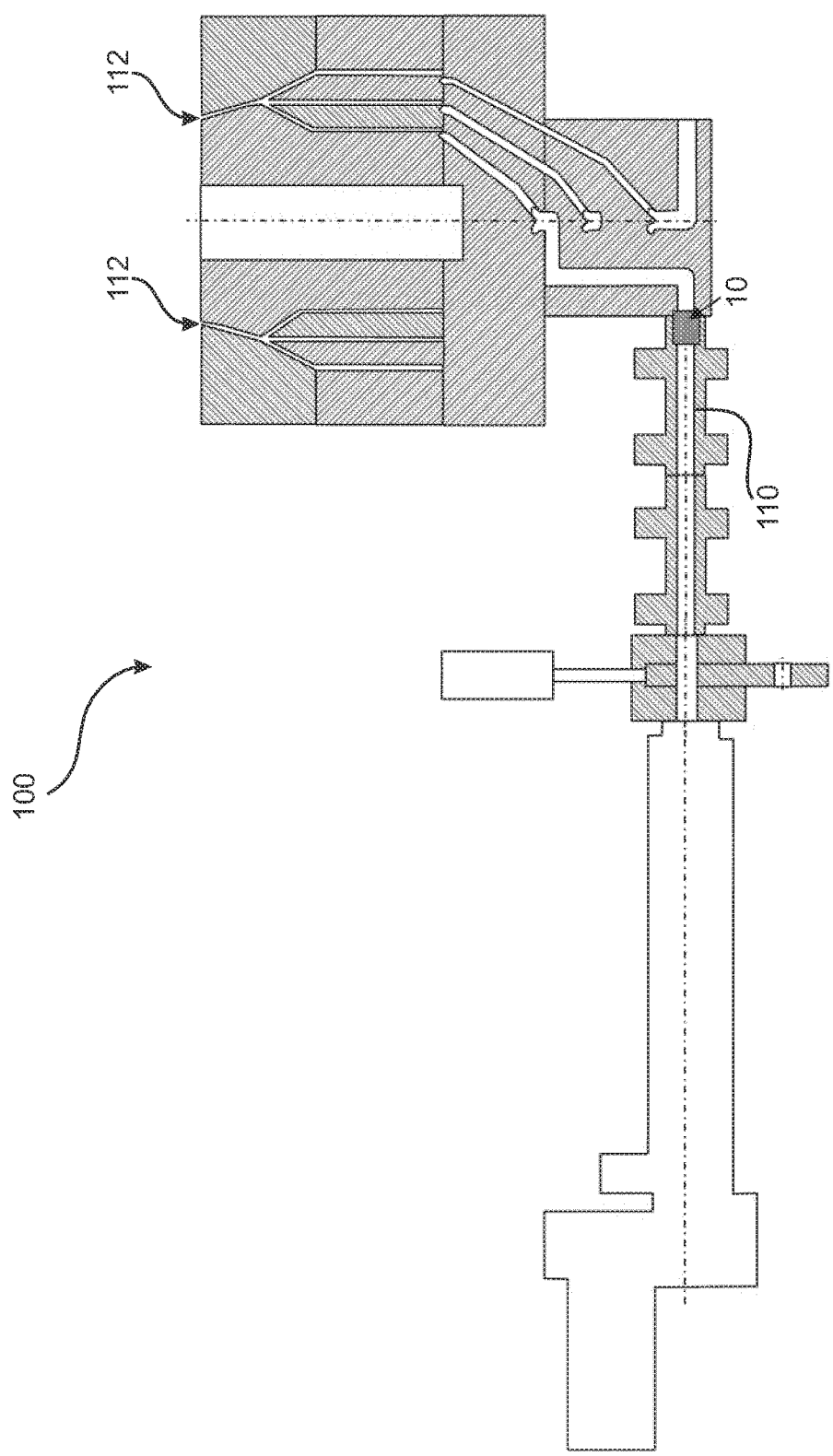

In FIG. 8 it is shown how in a melt channel 110 in a blow head 100 an overturning device 10 can be assembled. Thereby, it can be any described embodiment of the overturning device 10. Thereby, the blow head 100 is configured with a ring-like blow outlet 112.

FIG. 9 shows a solution comparable to FIG. 8, wherein here a shifting device 60 is shown for the overturning device 10. According to FIG. 9 the overturning device 10 is in the second position and therewith outside the fluid communicating intervention with the melt channel 110. Hereby, this is the operation position. For the purge situation the overturning device 10 is introduced into the melt channel 110 via the shifting device 60 and therewith the functionality according to the invention can be provided for the reduction of the purge time.

Figure 11:
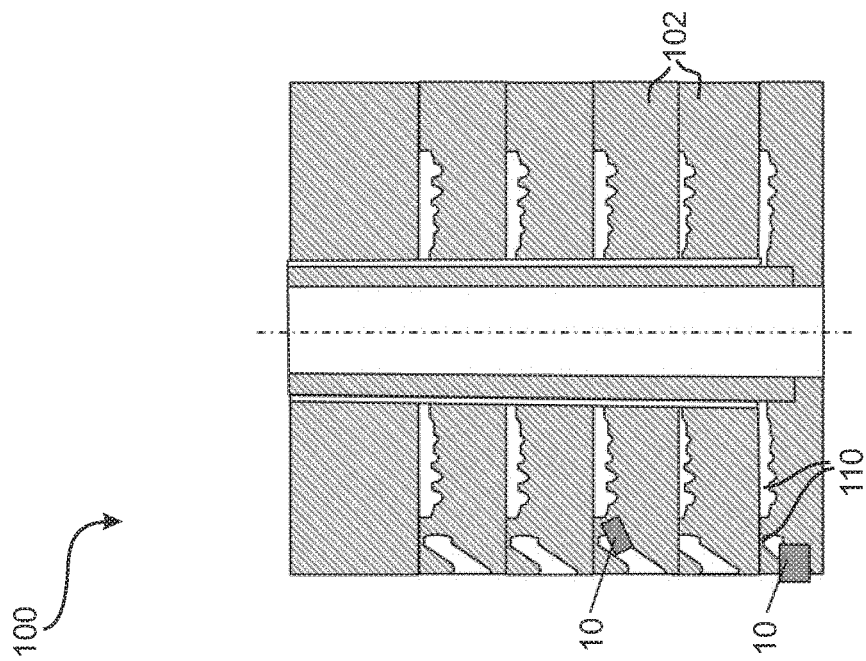
Figure 10:
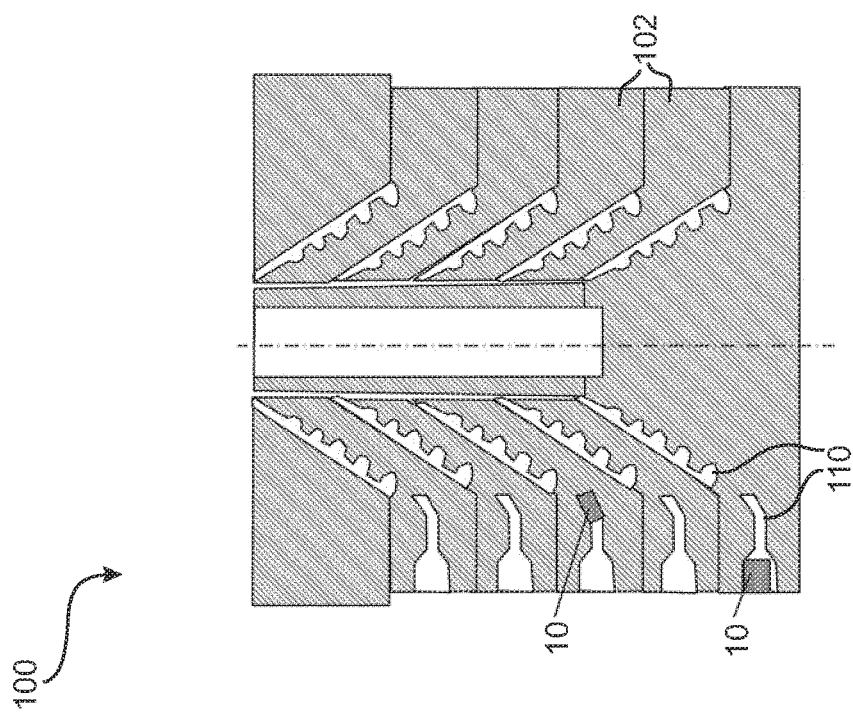
Figure 12:
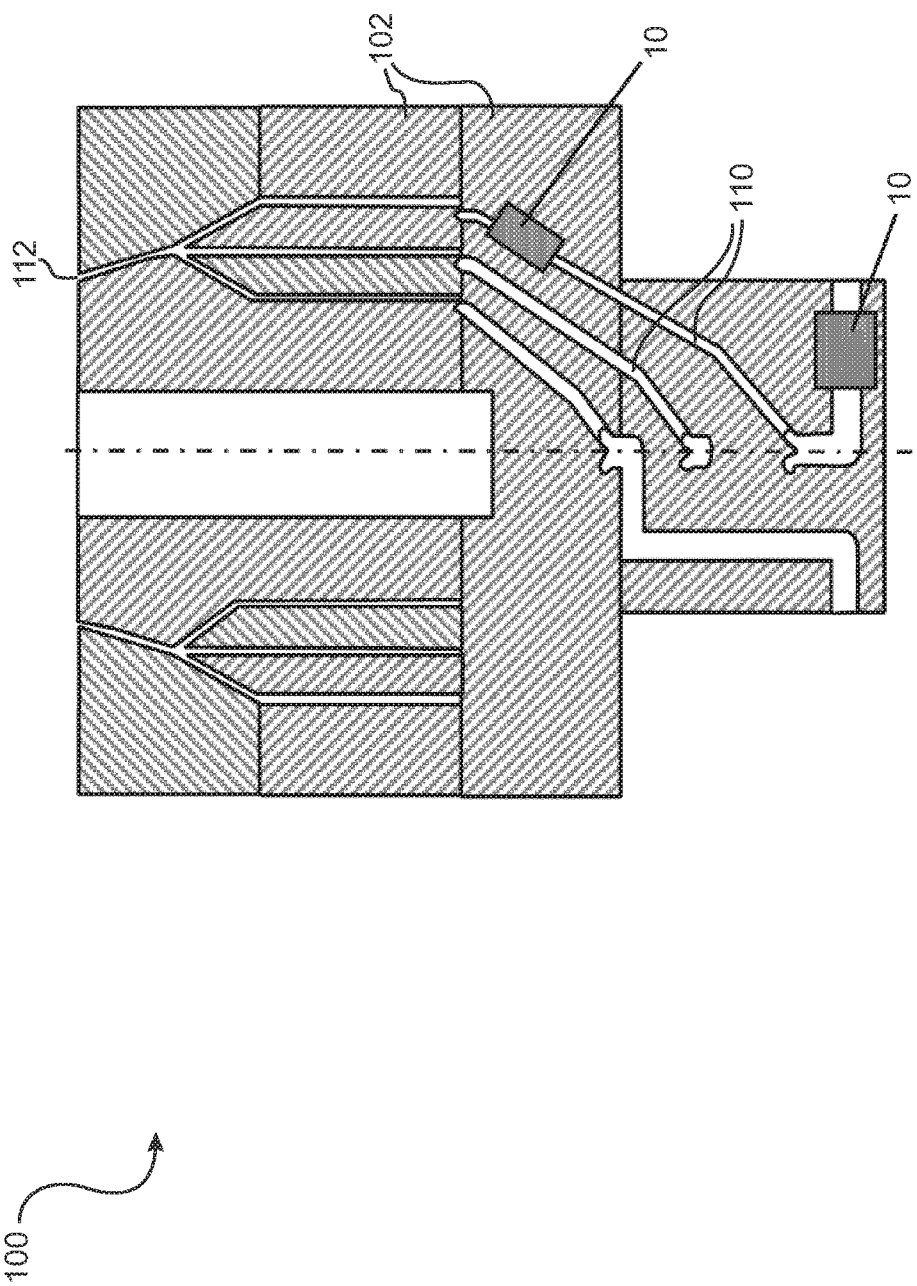

FIGS. 10 to 12 show further embodiments of blow heads 100 according to the invention. These embodiments have in common that the single blow heads 100 are configured with a plurality of components 102. The single melt channels 110 are thereby configured between the single components 102. In FIG. 10 a layer-wise configuration is shown which provides the single melt channels 110 with a conical embodiment. The single overturning devices 10 can be arranged in the inlet area and in the further course of the melt channels 110. A similar solution is likewise possible with a plate shaped layer configuration according to the embodiment of the blow head 100 according to FIG. 11. Here, likewise the single overturning devices 10 can be arranged between the single components 102 in the melt channels 110.

In FIG. 12 likewise a blow head 100 is shown which is configured from single components 102. Here, the branches can be well recognized which starting from the single melt channel 110 are provided. Likewise it can be well recognized that here two overturning devices can be assembled at different positions and therewith in different branch stages of the blow head 100.

The previous description of the embodiments describes the present invention only within the scope of examples. Naturally, single features of the embodiments as far as technically meaningful can be freely combined with one another without leaving the scope of the present invention.

REFERENCE SIGNS

10 Overturning device
20 Melt inlet
22 Centre of melt inlet
24 Edge of melt inlet
30 Melt outlet
32 Centre of melt outlet
34 Edge of melt outlet
40 Melt guidance means
42 First guidance channel
42a Guidance opening
42b Guidance outlet
44 Second guidance channel
44a Guidance opening
44b Guidance outlet
46 Separation section
46a First separation channel
46b Second separation channel
47 Division section
48 Combination section
60 Shifting device
70 Free flow area
100 Blow head
102 Component
110 Melt channel
112 Blow outlet
200 Molten material
210 New molten material
220 Old molten material

What is claimed is:

1. A blow head for performing a blow film extrusion method, comprising:
   a plurality of melt channels for the conveyance of molten material to at least one blow outlet of the blow head;
   at least one overturning device for overturning a molten material in at least one melt channel of the plurality of melt channel channels, the at least one overturning device comprising: a melt inlet and a melt outlet, wherein between the melt inlet and the melt outlet at least a melt guidance channel is assembled for a rearrangement of molten material from the centre of the melt inlet to the edge of the melt outlet and for a rearrangement of molten material from the edge of the melt inlet into the centre of the melt outlet, is assembled;
   wherein the at least one overturning device is configured as part of the at least one melt channel;
   wherein the plurality of melt channels branch within the blow head;
   wherein the at least one overturning device is arranged in a plurality of branch stages characterized by an increase of the amount of the melt channels along the plurality of branch stages:
   wherein the blow head has a circular blow outlet.

2. The blow head according to claim 1, wherein the at least one overturning device related to the length of the at least one melt channel is assembled in the middle or mainly in the middle of the at least one melt channel.

3. The blow head according to claim 1, wherein the overturning device is arranged in the at least one melt channel in form of a supply channel from an extruder to the at least one melt channels in form of distribution channels in the blow head.

4. The blow head according to claim 1, wherein the blow head comprises a plurality of components which are disconnected from one another, wherein the at least one melt channel and the at least one overturning device is assembled between the plurality of components.

5. The blow head according to claim 1, wherein at least two overturning devices are assembled in at least two of the plurality of melt channels.

6. The blow head according to claim 1, wherein in the plurality of melt channels are assembled at the same position, respectively.

7. The blow head according to claim 1,
   wherein the at least one overturning device comprises a shifting device for a shifting of the at least one overturning device between a first position in which the melt inlet and the melt outlet are in a fluid communicating connection with the melt channel and in a second position in which the melt inlet and the melt outlet are separated from the melt channel.

8. The blow head according to claim 1, wherein the at least one overturning device is configured as integral part of the respective melt channel.

9. The blow head according to claim 5, wherein the at least one overturning device comprises at least two overturning devices assembled in one of the plurality of melt channels such that a distance of each overturning device of the at least two overturning devices from a beginning of a respective melt channel are equal to a distance of another overturning device of the at least two overturning devices from the beginning of the respective melt channel.

10. A blow head for performing a blow film extrusion method comprising:
    a plurality of melt channels for the conveyance of molten material to at least one blow outlet of the blow head,
    at least one overturning device for overturning a molten material in at least one melt channel of the plurality of melt channels,
    the at least overturning device comprising
    a melt inlet and a melt outlet,
    wherein between the melt inlet and the melt outlet at least a melt guidance channel is assembled for a rearrangement of molten material from the center of the melt inlet to the edge of the melt outlet and for a rearrangement of molten material from the edge of the melt inlet into the centre of the melt outlet, is assembled,
    wherein the at least one overturning device is configured as part of the melt channels,
    wherein the plurality of melt channels branch within the blow head and the at least one overturning device is arranged in at least one branch stage of the branch,
    wherein when with the blow head a circular blow outlet is supplied with the corresponding molten material such a branching appears in the direction of the perimeter,
    wherein the single branching stages are characterized by an increase of amount of the melt channels, wherein simultaneously the cross section is reduced,
wherein the single branches define the borders between the single branch stages,
wherein on different branching stages corresponding overturning devices can be provided,
wherein by the branching thereby already a division of the molten material and therewith a partial division of the corresponding edge layer occurs.

* * * * *